(12) United States Patent
Kim et al.

(10) Patent No.: US 9,247,142 B2
(45) Date of Patent: Jan. 26, 2016

(54) METHOD AND APPARATUS FOR PROVIDING THE OPERATION STATE OF AN EXTERNAL DEVICE

(75) Inventors: Ji Hea Kim, Seoul (KR); Jong Ook Kim, Seoul (KR); You Sook Eun, Seoul (KR); Ji Sun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 13/807,222

(22) PCT Filed: Jul. 23, 2010

(86) PCT No.: PCT/KR2010/004864
§ 371 (c)(1),
(2), (4) Date: May 9, 2013

(87) PCT Pub. No.: WO2012/002603
PCT Pub. Date: Jan. 5, 2012

(65) Prior Publication Data
US 2013/0222672 A1    Aug. 29, 2013

Related U.S. Application Data

(60) Provisional application No. 61/359,191, filed on Jun. 28, 2010.

(51) Int. Cl.
*H04N 5/232*    (2006.01)
*H04N 5/272*    (2006.01)
(Continued)

(52) U.S. Cl.
CPC ........ *H04N 5/23293* (2013.01); *G06K 9/00671* (2013.01); *H04N 5/272* (2013.01); *F24F 1/0007* (2013.01); *F24F 2011/0068* (2013.01); *G06T 19/006* (2013.01)

(58) Field of Classification Search
CPC .......... H04N 1/00307; H04N 5/23293; H04N 5/272; H04N 2201/3245; G06T 19/006; G06T 2215/16; G06F 3/011–3/015; G06K 9/00671; G06K 9/00664–9/00704; F24F 1/0007; F24F 2011/0068

USPC ............. 348/207.99, 222.1, 333.01–333.13; 455/418, 575.1–575.8; 700/10; 62/127; 345/632, 633

See application file for complete search history.

(56) References Cited

U.S. PATENT DOCUMENTS

| 6,697,761 B2* | 2/2004 | Akatsuka et al. ............ 702/151 |
| 8,400,548 B2* | 3/2013 | Bilbrey et al. ........... 348/333.01 |
| 2002/0049775 A1 | 4/2002 | Friedrich et al. |

(Continued)

FOREIGN PATENT DOCUMENTS

| JP | 2007-053424 | 3/2007 |
| KR | 10-2005-0055507 A | 6/2005 |

(Continued)

OTHER PUBLICATIONS

Suzuki et al., "u-Photo: Interacting with Pervasive Services using Digital Still Images," Lecture Notes in Computer Science—LNCS, Springer, DE, vol. 3468, Jan. 1, 2005, pp. 190-207.*

(Continued)

*Primary Examiner* — Dennis Hogue
(74) *Attorney, Agent, or Firm* — Dentons US LLP

(57) ABSTRACT

The present invention provides a method for providing the operation state of an external device and an apparatus using the method. A method for providing the operation state of an external device according to the present invention comprises displaying a preview image of a camera; identifying an external device displayed on the preview image; generating an indicator corresponding to the operation state of the external device; and displaying the indicator by matching the indicator to an area in the preview image to which a component related to the operation state belongs. According to the present invention, information about the operation state of a component disposed inside of an external device can be checked by making use of augmented reality.

12 Claims, 15 Drawing Sheets

(51) Int. Cl.
*G06K 9/00* (2006.01)
*G06T 19/00* (2011.01)
*F24F 1/00* (2011.01)
*F24F 11/00* (2006.01)

(56) References Cited

U.S. PATENT DOCUMENTS

| | | | |
|---|---|---|---|
| 2002/0128728 A1* | 9/2002 | Murakami et al. | 700/10 |
| 2006/0026972 A1* | 2/2006 | Masui et al. | 62/127 |
| 2007/0242131 A1 | 10/2007 | Sanz-Pastor et al. | |
| 2007/0268392 A1* | 11/2007 | Paalasmaa et al. | 348/333.02 |
| 2009/0237546 A1* | 9/2009 | Bloebaum et al. | 348/333.01 |
| 2010/0159434 A1 | 6/2010 | Lampotang et al. | |
| 2010/0317332 A1* | 12/2010 | Bathiche et al. | 455/418 |

FOREIGN PATENT DOCUMENTS

| | | |
|---|---|---|
| KR | 10-2006-0021001 A | 3/2006 |
| KR | 10-2009-0106069 A | 10/2009 |
| KR | 10-2010-0128490 A | 12/2010 |
| KR | 10-2011-0035038 A | 4/2011 |
| KR | 10-2012-0133648 A | 12/2012 |
| WO | WO 2007048823 A1 * | 5/2007 |
| WO | 2009-109231 A1 | 9/2009 |

OTHER PUBLICATIONS

Friedrich, "ARVIKA Augmented Reality for Development, Production, and Service," ISMAR 2002, International Symposium on Mixed and Augmented Reality, IEEE, 2002.*

Gausemeier et al., "AR-based Configuration and Information Retrieval of Household Appliances on Mobile Devices," CHINZ '03 Proceedings of the 4th Annual Conference of the ACM Special Interest Group on Computer-Human Interaction, pp. 93-98, 2003.*

* cited by examiner

METHOD AND APPARATUS FOR PROVIDING THE OPERATION STATE OF AN EXTERNAL DEVICE

This application is a 35 USC §371 National Stage entry of International Application No. PCT/KR2010/004864 filed on Jul. 23, 2010, and claims priority of U.S. Provisional Application No. 61/359,191 filed on Jun. 28, 2010, all of which are incorporated by reference in their entirety herein.

TECHNICAL FIELD

The present invention relates to a method and an apparatus for providing the operation state and more particularly, a method and an apparatus for providing the operation state of an external device by using augmented reality.

BACKGROUND ART

The use of mobile communication devices equipped with a camera (for example, PDA (Personal Digital Assistant), camera phone, smart phone, and so on), digital camcorders, digital cameras, and the like, which may be called collectively digital image capture devices, is steadily expanded around the world.

Such kind of image capture device usually provides a preview image, where a preview function enables a user to choose a scene by displaying images reflected in the lens as if they are a series of continuous images.

An emerging technology provides information about an object included in the preview image described above or information about objects within a predetermined distance. The technology above is called augmented reality.

Augmented reality is a technology which superimposes information related to a real world on the real world image, providing a mixed reality of a real world image and information. By utilizing the augmented reality, the user can easily obtain information related to the real world.

Under these circumstances, various means for providing the user with more useful information through augmented reality are under development.

DISCLOSURE

Technical Problem

The present invention has been made in an effort to provide a method for providing the operation state of an external device displayed on a preview image and an apparatus using the method as a technology realizing augmented reality.

Technical Solution

To achieve the objective above, the present invention provides a method for providing the operation state of an external device, comprising displaying a preview image of a camera; identifying an external device displayed on the preview image; generating an indicator corresponding to the operation state of the external device; and displaying the indicator by matching the indicator to an area in the preview image to which a component related to the operation state belongs.

To achieve the objective above, a mobile terminal of the present invention comprises a camera; a display unit displaying a preview image of the camera; and a controller identifying an external device displayed on the preview image, generating an indicator corresponding to the operation state of the external device, and displaying the indicator by matching the indicator to an area in the preview image to which a component related to the operation state belongs.

Advantageous Effects

According to the present invention, information about the operation state of a component disposed inside an external device can be checked by making use of augmented reality.

Since information about the operation state of a component is provided being combined with an image corresponding to the component, the user can more easily check the information about the operation state of the component.

BEST MODE

In what follows, the present invention will be described in more detail with reference to appended drawings.

External devices for which the present invention is applied refer to home appliances such as an air conditioner, washer, TV, oven, and the like, capable of providing information about the operation states of constituent components independently while the individual components operate in conjunction with each other. For the convenience of description, an air conditioner will be used as an example.

FIGS. 1 to 4 illustrate an air conditioner according to one embodiment of the present invention.

Figure 1:
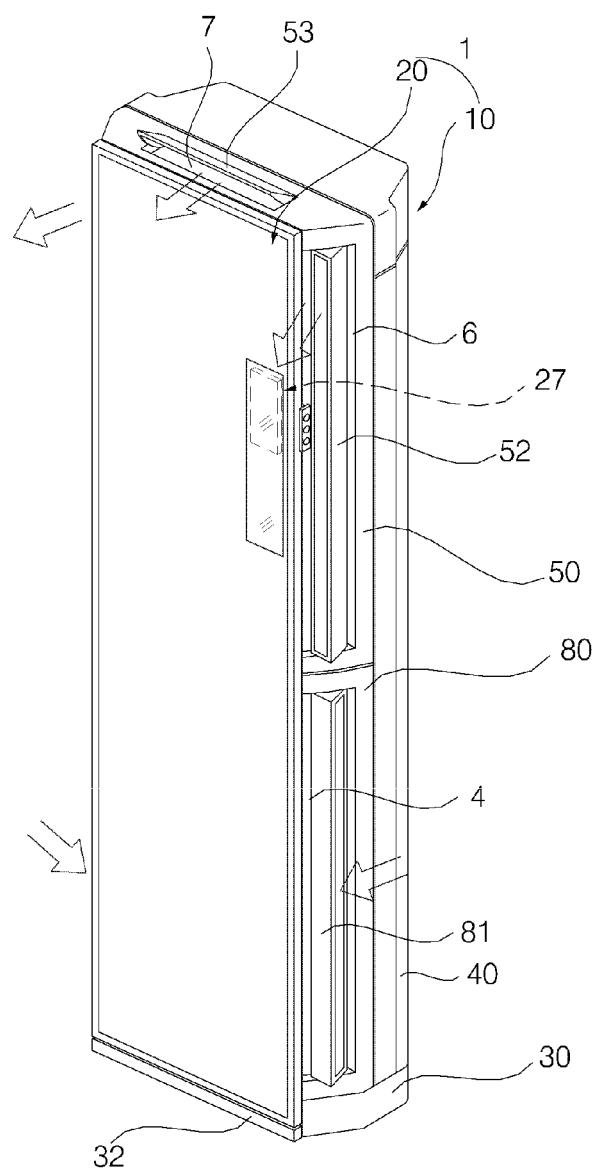
FIG. 1 is a perspective view of an air conditioner according to one embodiment of the present invention, where an air intake opening and exhaust opening are opened.
Figure 2:
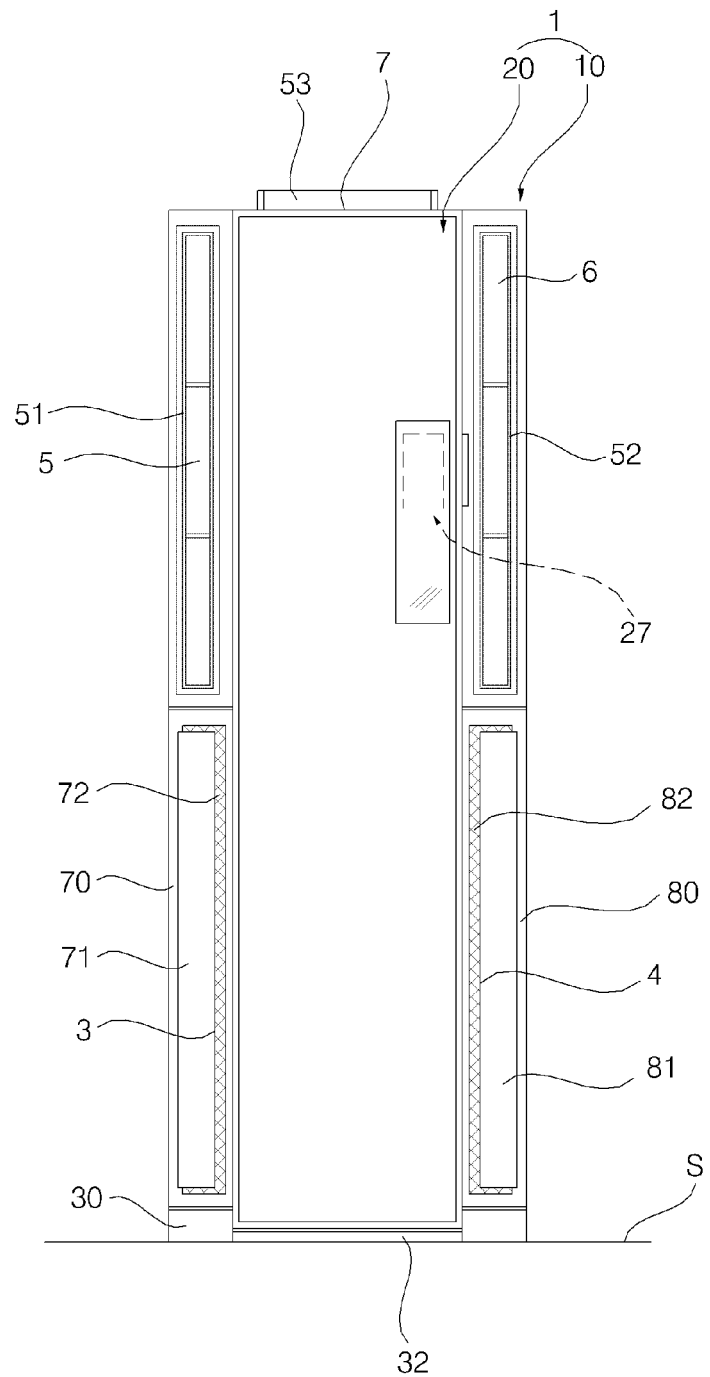
FIG. 2 is a front view of an air conditioner according to one embodiment of the present invention, where an air intake opening and exhaust opening are opened.

FIG. 1 is a perspective view of an air conditioner according to one embodiment of the present invention, where an air intake opening and exhaust opening are opened; FIG. 2 is a front view of an air conditioner according to one embodiment of the present invention, where an air intake opening and exhaust opening are opened.

As shown in FIGS. 1 and 2, air intake openings 3, 4 and air exhaust openings 5, 6, 7 are formed in an air conditioner according to the present invention so that air flows in and out of the main body 1.

The main body 1 comprises an air conditioning unit 10 in which air intake openings 3, 4 and air exhaust openings 5, 6, 7 are formed; and a front panel 20 connected to the air conditioning unit 10 in a rotatable manner to open or close part or whole of the front surface of the air conditioning unit 10.

Here, the air conditioning unit 10 is a kind of casing forming an external shape of the air conditioner and including a heat exchanger for air conditioning inside the air conditioning unit 10; and comprises a base 30, a cabinet 40, an upper panel 50, and a lower panel 70, 80.

A short protrusion 32 is formed in the base 30 toward a lower part of the front panel 20 in order for a gap between the lower part of the front panel 20 and a floor surface S of indoor space to be kept small when the front panel 20 being disposed in parallel with the front surface unit of the air conditioning unit is closed.

A left side air exhaust opening 5 is formed in the left side of the upper panel 50 while a right side air exhaust opening 6 is formed in the right side of the upper panel 50. An upper air exhaust opening 7 is formed in at least one of the front surface upper unit and the upper surface unit.

In what follows, it is assumed that the upper air exhaust opening 7 is formed in the upper surface unit of the upper panel 50.

The left side air exhaust opening vane 51, which opens or closes the left side air exhaust opening 5 and controls direction of air flow discharged through the left side air exhaust opening 5, is disposed in the upper panel 50 in a rotatable manner and the upper panel 50 is also equipped with a left side air exhaust opening vain motor rotating the left side air exhaust opening vane 51.

The right side air exhaust opening vane 52, which opens or closes the right side air exhaust opening 6 and controls direction of air flow discharged through the right side air exhaust opening 6, is disposed in the upper panel 50 in a rotatable manner and the upper panel 50 is also equipped with a right side air exhaust opening vain motor rotating the right side air exhaust opening vane 52.

The upper side air exhaust opening vane 53, which opens or closes the upper side air exhaust opening 7 and controls direction of air flow discharged through the upper side air exhaust opening 7, is disposed in the upper panel 50 in a rotatable manner and the upper panel 50 is also equipped with an upper side air exhaust opening vain motor rotating the upper side air exhaust opening vane 53.

The lower panel 70, 80 comprises a left side lower panel 70 being disposed between the left side part of the upper panel 50 and the base 30 and incorporating a left side air intake opening 3 therein; and a right side lower panel 80 being disposed between the right side part of the upper panel 50 and the base 30 and incorporating a right side air intake opening 4.

A left side air intake vane 71 opening or closing the left side air intake opening 3 is disposed in the left side lower panel 70 in a rotatable manner and the left side lower panel 70 is also equipped with a left side air intake opening vane motor rotating the left side air intake opening vane 71 and a left side filter 72 filtering the air flowing into the left side air intake opening 3.

A right side air intake vane 81 opening or closing the right side air intake opening 4 is disposed in the right side lower panel 80 in a rotatable manner and the right side lower panel 80 is also equipped with a left side air intake opening vane motor rotating the left side air intake opening vane 81 and a right side filter 82 filtering the air flowing into the right side air intake opening 4.

The reference symbol 27 shown in FIGS. 1 and 2 is a first display unit displaying various kinds of information including operation information of an air conditioner, which can be installed being fixed selectively in one side of the front panel 20 among various positions available or can be disposed in the front panel 20 in a movable manner.

Figure 3:
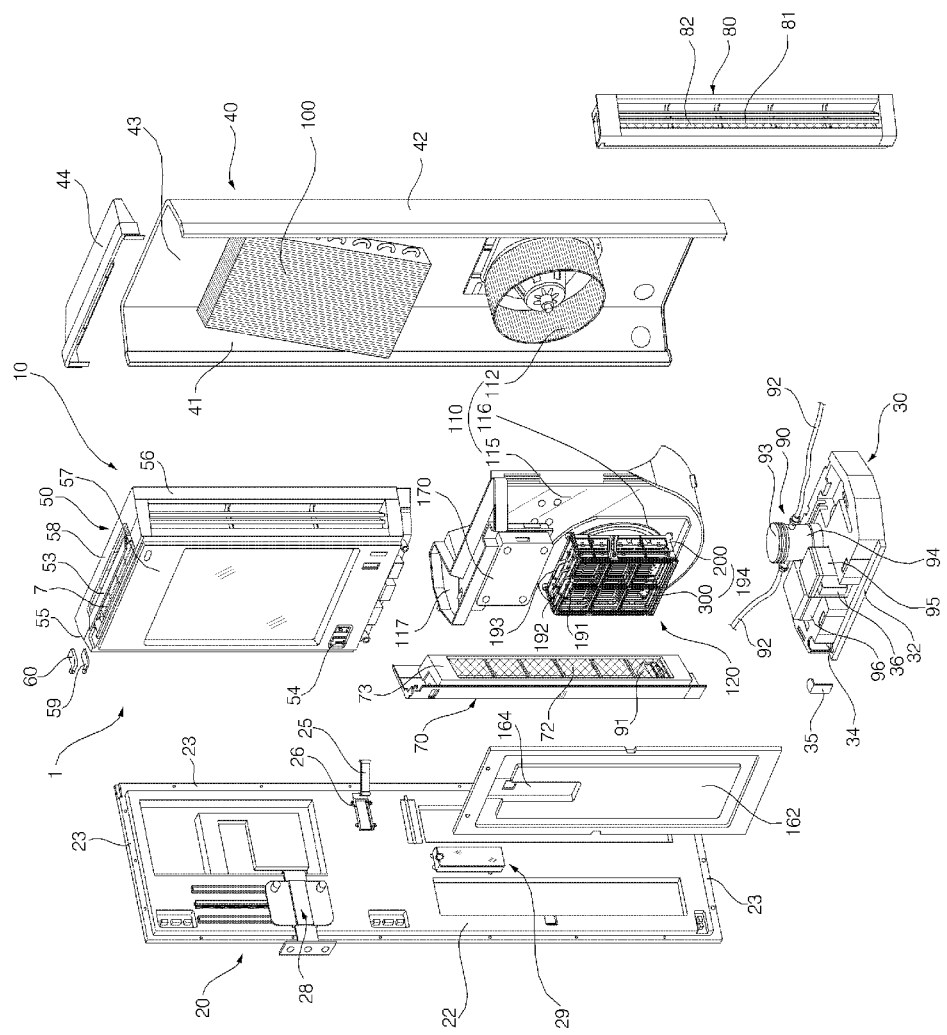
FIG. 3 is an exploded view of an air conditioner according to one embodiment of the present invention.

FIG. 3 is an exploded view of an air conditioner according to one embodiment of the present invention.

With reference to FIG. 3, the front panel 20 is a kind of door installed to open or close part or the whole of the front surface of the air conditioning unit 10. The height of the front panel 20 is determined as that of opening or closing up to the upper end of the front surface unit of the upper panel 50, where the front panel 20 comprises glass 21 disposed in the front, a glass panel 22 disposed in the rear of the glass 21, and a cover 23 assembling the glass 21 and the glass panel 222.

The cover 23 covers the glass 21 and the edges of the glass panel 22 and is fastened to the glass panel 22 by a fastening means such as a hook or a fastening bolt. The cross section of the cover 23 roughly forms a 'ㄷ' shape; the cover 23 comprises a sub-cover covering the glass 21; and a left, right, upper, and lower side sub-covers each covering the left, right, upper, and lower edge part of the glass panel 22, where the sub-covers are disposed roughly in the overall shape of 'ㅁ' along the glass 21 and the edge part of the glass panel 22.

An opaque unit 24 with a predetermined color or pattern may be printed on the rear surface of the glass 21 in the front panel 20 and at the same time, an opaque sheet may be attached separately to the rear surface of the glass 21. In what follows, descriptions are given based on the assumption of using the opaque unit 24. Each of the upper and lower part of the front panel 20 is fastened to the front unit side of the air conditioning unit 10 through a hinge in such a way that the front panel 20 is rotated to protrude toward the front around a left or right axis. An approximate central part of the left or right axis of the front panel 20 is connected to the air conditioning unit 10, particularly to the upper panel 50 through a connecting apparatus, where the connecting apparatus is so constructed that the front panel 50 does not open or close abruptly but moves smoothly.

The connecting apparatus is slid to be connected to one side of the front panel 20 or the upper panel 50 and comprises a sliding member 25 connected to the other side of the front panel 20 or the upper panel 50 through a hinge. A hinge connecting unit 54 is formed in one side of the front panel 20 or the upper panel 50, through which the sliding member 25 is hinge-connected in a rotatable manner whereas a sliding guide unit 26 is formed in the other side of the front panel 20 or the upper panel 50, through which the sliding member 25 is guided.

At the time of rotation, the front panel 20 is slid along the sliding guide unit 26 while the sliding member 25 rotates around the hinge connecting unit 54; a friction force is applied to the sliding member 25 at the time of sliding and abrupt opening or closing of the front panel 20 is constrained by the friction force of the sliding member 25. In other words, the front panel 20 is supported as the upper, central, and lower part of the left or right side of the front panel 20 are connected to the air conditioning unit 10 respectively.

In case a first display unit 27 is disposed in a movable manner, the front panel 20 is equipped with a first display unit moving apparatus 28 which moves and positions the first display unit 27 while being directly connected to the first display unit 27.

The first display unit moving apparatus 28 can be implemented in a form where a manual type moving apparatus moves and positions the first display unit 27 or in another form where an automated moving apparatus including an assembly of motors and gears automatically moves and positions the first display unit.

Meanwhile, a remote controller box 29 is installed at the front panel 20, where a remote controller R capable of controlling the air conditioner remotely is kept inside. The remote controller box 29 is disposed on the rear surface of the front panel 20 to avoid being exposed to the outside of the main body 1 when the front panel 20 is closed. The remote controller box 29 constitutes a front panel assembly together with the first display unit 27, the first display moving apparatus 28, and the front panel 20.

Meanwhile, a lower hinge bracket 34 is installed at the base 30 by a fastening member such as a fastening bolt, through which a lower part of the left or right side of the front panel 20 is connected in a rotatable manner. A lower bracket cover 35, which covers part of the lower hinge bracket 34, particularly the part fastened to the base 30, is installed at the base 30. A box attachment unit 36, through which a dust box 95 of a cleaning apparatus 90 to be described later is slid in a forward and backward direction, is formed in the base 30.

The cabinet 40 is disposed in a vertical direction in the upper side of the rear part of the base; front, upper, and lower surface of the cabinet 40 are opened and the left and right side surface unit 41, 42 are formed being sloped against the rear surface unit 43.

Figure 4:
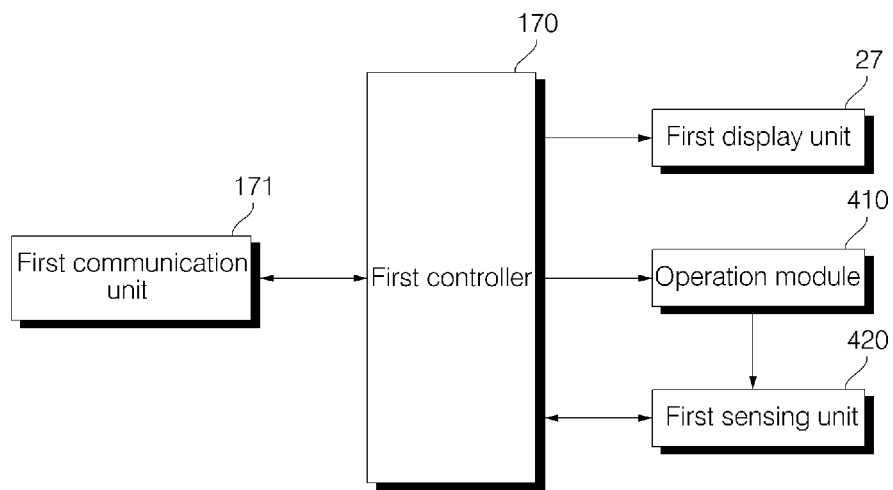
FIG. 4 is a block diagram of an air conditioner according to one embodiment of the present invention.
Figure 5:
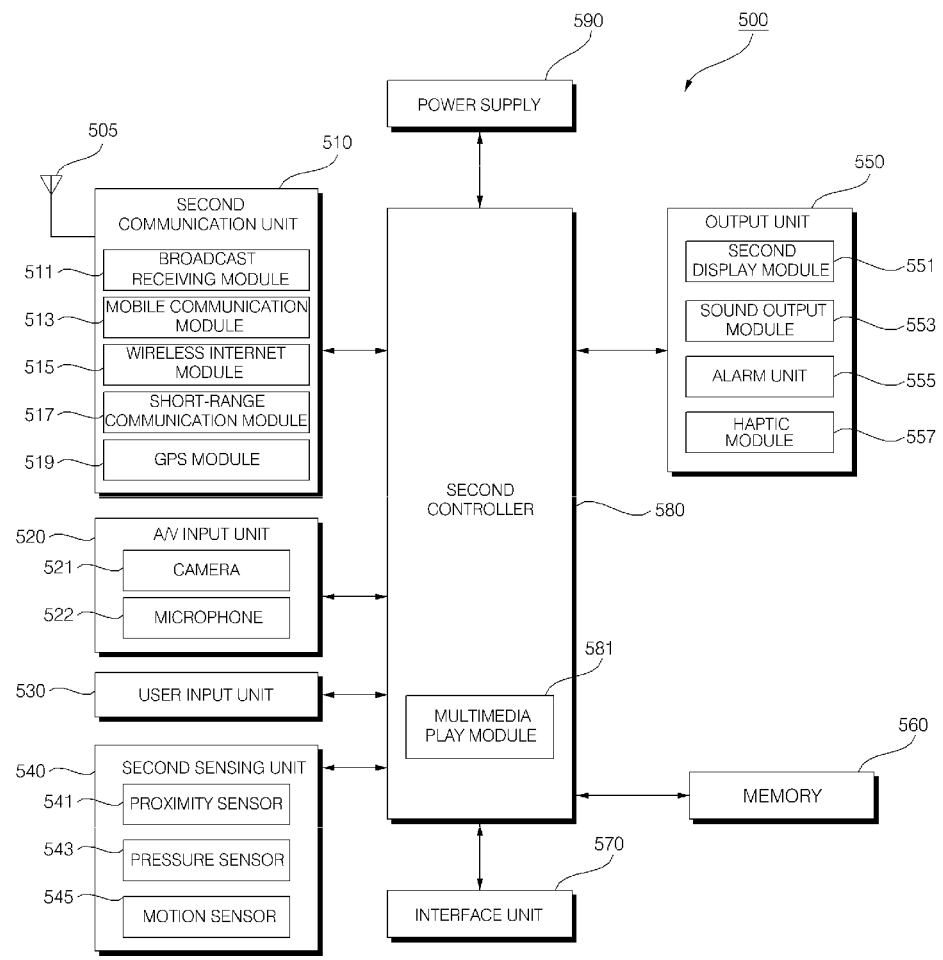
FIG. 5 is a block diagram of a mobile terminal according to one embodiment of the present invention.

As shown in FIG. 5, the lower and rear surface of the upper panel 50 are opened; the left and right side surface unit 55, 56 are formed being sloped against the front surface unit 57; and the upper surface unit 58 is formed to be orthogonal to the front surface unit 57. As shown in FIGS. 3 to 5, an upper hinge bracket 59 is installed at the upper panel 50 by a fastening member such as a fastening bolt, through which a lower part of the left or right side of the front panel 20 is connected in a rotatable manner. An upper bracket cover 60 which covers part of the upper hinge bracket 58 is installed at the upper panel 50.

A filter frame 73 equipped with a left side filter 72 and a right side filter 82 are installed being fixed respectively to the left side lower panel 70 and the right side lower panel 80. Meanwhile, a cleaning unit 90 which automatically cleans the left 72 and right side filter 82 is installed at the air conditioning unit 10.

The cleaning unit 90 comprises a filter kit 91 being disposed in each of the left side lower panel 70 and the right side lower panel 80 in a movable manner to move along the left 72 and the right side filter 82 and collecting dust of the left 72 and the right side filter 82; a kit air blower 93 being connected to the filter kit 91 through a dust hose 92 and making filter foreign substances of a filter such as dust in the left and right side inhaling filter 92; a cyclone 94 separating the inhaled filter foreign substances from the air; a dust box 95 collecting filter foreign substances separated from the cyclone 94; a kit control box 96 controlling the filter cleaning unit; and a sensing unit (not shown) sensing the dust storage rate of the dust box 95.

Also, the air conditioning unit 10 is equipped with a heat exchanger 100 heating or cooling down the air by using a refrigerant and an air blower 110 inhaling external air of the air conditioning unit 10 into the air conditioning unit 10 and making the air flow through the heat exchanger 100 and again blowing to the outside of the air conditioning unit 10.

The heat exchanger 100 is installed in at least one of the cabinet 50 and the air blower 110 so that the heat exchanger 100 is disposed being sloped between the upper part of the cabinet 40 and the upper panel 50. The air blower 110 is installed at the cabinet 40 so that the air blower 110 is disposed in a lower side of the heat exchanger 100. The air blower 110 comprises an air blowing motor 111 installed in a lower part of the cabinet 40; an air blowing fan 112 connected to the air blowing motor 111; a fan housing 115 installed at the cabinet 40 and having an opening 113 in the front surface unit of the fan housing 115 and a discharging unit 114 in the upper surface unit of the fan housing 115; and an orifice 116 disposed in the front surface of the fan housing 115.

A drain fan 117, which receives condensed water dropped from the heat exchanger 100 and supports the heat exchanger 100 while the heat exchanger 100 is laid above, is formed in the upper part of the fan housing 115. An air inhaling unit 116A which makes the air inhaled to the fan housing 115 is formed in the center of the orifice 116.

Meanwhile, since an opening 160 is formed between the base 30 and the upper panel 50 and between the left 70 and right side lower panel 80, cleaning units 191, 192, 193 to be described later can go in and out through the opening 160 for the purpose of cleaning or substitution of the cleaning units 191, 192, 193. Moreover, the cleaning units 191, 192, 193 can be used for providing services of various components such as the kit air blower 93 and the kit control box 96 installed in the inner lower part of the air conditioning unit 10. An inner cover 162, which improves an external view when the front panel 20 is opened and at the same time, improves safety by blocking the opening 160, is installed in the air conditioning unit 10.

It is preferable for the inner cover 162 to be assembled into the lower part of the upper panel 50 through a fastening means such as a fastening bolt. In the inner cover 162, a box avoiding home unit 164, which avoids the remote controller box 29 so that part of the remote controller box 29 can be inserted when the front panel 20 is closed, is formed being considerably depressed toward the rear side.

Meanwhile, a first controller 170 controlling various electronic components controlling the air conditioner is installed inside the air conditioning unit 10. The first controller 170 is connected to the kit control box 96, the air blower motor 111, or the first display unit 27 through cable such as electric wire; it is preferable for the first controller 170 to be disposed at a position where the first controller 170 is exposed to the outside through the opening 160 when the front panel 20 is opened toward the front and the inner cover 160 is separated from the air conditioning unit 10, for example, at the upper front part of the air blower 110.

And the main body 1 is equipped with a purifying apparatus 180 purifying the air inhaled into the orifice 116 when the air blowing fan 112 is rotated.

The purifying apparatus 180 comprises at least one purifying unit 191, 192, 193 and a purifying unit holder 194 which at least one purifying unit 191, 192, 193 is attached to or detached from.

It is preferable for the purifying unit 191, 192, 193 to be disposed in such a way that different kinds of purifying substances purifies the air step by step. The purifying unit 191, 192, 193 is not limited to a particular type of filter and comprises at least one of a pre-filter filtering out large foreign substances contained in the air; a hepa filter, which is a high efficiency filter filtering out micro-scale dust; a nano-filter providing excellent deodorization and anti-bacterial performance; an option filter installed selectively such as a yellow dust filter, an deodorization filter, and so on; a hybrid filter made of non-woven fabric and a plurality of polyurethane substances of different density; and a plasma dust collector filter which ionizes and collects dust.

In what follows, it is assumed that the option filter 191 installed selectively such as yellow dust filter or deodorization filter; the hepa filter 192, which is a high efficiency filter filtering out micro-scale dust; and electrostatic dust filter 193 which ionizes dust in the air and collects the dust are disposed in the order of appearance in the purifying unit 191, 192, 193.

The electrostatic dust filter 193 comprising the purifying unit 191, 192, 193 is equipped with a power terminal 193' shown in the lower part of the figure, through which high voltage power is supplied from the outside.

The purifying unit holder 194 is so constructed that air flows in through the front surface, left and right side surface, and upper and lower surface and the air flows out through the rear surface. In case insertion or withdrawal of the purifying unit 191, 192, 193 is carried out in a vertical direction, the purifying unit may be easily damaged as it makes contact with the front surface of the air blower 110 or a drain fan 117 and at the same time, the insertion/withdrawal motion is not carried out with ease. In case insertion or withdrawal of the purifying unit 191, 192, 193 is carried out in a horizontal direction, the user has to bend his or her body to carry out the insertion or withdrawal of the purifying unit 191, 192, 193. On the other hand, in case insertion or withdrawal of the purifying unit 191, 192, 193 is carried out in a vertical direction making a slope, damage to the purifying unit 191, 192, 193 can be avoided and at the same time, the insertion or withdrawal motion can be carried out easily; therefore, the purifying unit holder 194 is so constructed to make the purifying unit 191, 192, 193 inserted or withdrawn with an inclination angle.

The purifying unit holder 194 comprises a fixed body 200 and a rotating body 300 connected to the fixed body 200 in a rotatable manner and attached to the purifying unit 191, 192, 193, where a lower part of the rotating body 300 is hinge-connected to a lower part of the fixed body 200.

The fixed body 200 is installed inside the main body 1, particularly, the air conditioning unit 10; therefore, the fixed body 200 is installed to be disposed between the opening 160 of the air conditioning body 10 and the air inhaling unit 116A of the air blower 110. In other words, the fixed body 200 is installed in the front surface unit of the air blower 110 to be disposed in the front of the air inhaling unit 116A of the air blower 110.

The rotating body 300, making contact with a dust collecting filter terminal 193' of the electrostatic dust filter 193, is equipped with a power supplying terminal 343 providing high voltage power.

The power supplying terminal 343 is installed being laid above a terminal holder 344 attached to or detached from a lower part of the rotating body 300 through a hook.

It can be said that the air conditioner as constructed above comprises a plurality of components. According to the functions performed, the plurality of components can be divided into supporting components which form the external shape of the air conditioner or support other components (for example, the air conditioning unit 10, front panel 20 base 30, cabinet 40, upper panel 50, and lower panel 70, 80, and so on) and functional components carrying out particular functions at the time of operation of the air conditioner (for example, air exhaust opening vane 51, 52, 53, air exhaust opening vane motor, cleaning unit 90, first controller 170, purifying apparatus 180, and so on). The functional components can be further divided into control components controlling the operation of other components (for example, first controller 170, kit control box 96 among cleaning unit 90, and so on), operation components carrying out particular operations according to the control of the control components and generating information about inherent operation states (for example, dust box 95 of the cleaning unit 90, purifying unit 191, 192, 193 of the purifying apparatus 180, and so on) and sensing components detecting information about the operation states of the operation components (for example, sensing unit).

The functions of the air conditioner as constructed above will be provided below with reference to the block diagram of FIG. 4.

First, an input unit including at least one button is installed in the exterior of the indoor unit. As a matter of course, the input unit can be incorporated into the first display unit 27 of touchscreen type. In this way, control commands can be provided through the main body of the indoor unit or control commands can be received through the first communication unit 171 from a remote controller, by which communication with an external device is carried out.

At this time, the first communication unit 171 assumes infrared communication but wireless communication model utilizing a frequency band of bluetooth, wireless LAN, and so on can also be applied in addition thereto.

The operation module 410 refers to a functional block which changes information about the operation state according to the operation of the air conditioner, including the cleaning unit 90 and the purifying apparatus 180.

The first sensing unit 420 detects information about the operation state of the operation module. Information about the operation state detected by the first sensing unit 420 is transmitted to a terminal (for example, a mobile terminal, a remote controller, and so on) through the first communication unit 171 under the control of the first controller 170.

Examples of a terminal displaying an indicator about the operation state of an external device described in this document include devices equipped with a camera such as a mobile phone, smart phone, notebook computer, digital broadcasting terminal, PDA (Personal Digital Assistant), PMP (Portable Multimedia Player), navigation device, remote controller, and so on. For the convenience of description, a mobile terminal is used as an example.

FIG. 5 is a block diagram of a mobile terminal according to one embodiment of the present invention. With reference to FIG. 5, a mobile terminal according to one embodiment of the present invention will be described in terms of functional aspect.

With reference to FIG. 5, the mobile terminal comprises a wireless communication unit 510, A/V (Audio/Video) input unit 520, user input unit 530, sensing unit 540, output unit 550, memory 560, interface unit 570, second controller 580, and power supply 590. The configuration as stated above, according to actual needs during implementation, can be modified such that two or more components are merged into one component or one component is divided into two or more sub-components.

The wireless communication unit 510 comprises a broadcasting receiving module 511, mobile communication module 513, wireless Internet module 515, short range communication module 517, and GPS module 519.

The broadcasting receiving module 511 receives at least one of broadcasting signal and broadcasting-related information from an external broadcasting management server through a broadcasting channel. At this time, the broadcasting channel may include satellite channels, terrestrial channels, and so on. The broadcasting management server may refer to a server generating and transmitting at least one of broadcasting signal and broadcasting-related information or a server receiving and transmitting at least one of pre-generated broadcasting signal and broadcasting-related information.

Broadcasting-related information may refer to the information about broadcasting channel, broadcasting program, or broadcasting service provider. The broadcasting signal includes not only TV broadcasting signal, radio broadcasting signal, and data broadcasting signal but also a broadcasting signal in the form of a TV broadcasting signal or radio broadcasting signal combined with a data broadcasting signal. Broadcasting-related information can be provided through a mobile communication network and in this case, the information can be received by a mobile communication module 513. Broadcasting-related information can be represented in various forms.

The broadcasting receiving module 511 receives a broadcasting signal by using various broadcasting systems; a digital broadcasting signal can be received by using a digital broadcasting system. Also, the broadcasting receiving module 511 can be configured to be suitable for all kinds of broadcasting systems providing broadcasting signals in addition to the digital broadcasting system stated above. The broadcasting signal or broadcasting-related information received through the broadcasting receiving module 511 can be stored in the memory 560.

The mobile communication module 513 communicates a wireless signal with at least one of a base station, an external terminal, and a server belonging to a mobile communication network. Here, the wireless signal includes various forms of data according to a voice call signal, a video communication call signal, or text/multimedia message communication.

The wireless Internet module 515 refers to a module for wireless Internet access, which can be installed inside or outside the mobile terminal 500. Technologies for wireless Internet include WLAN (Wireless LAN, Wi-Fi), Wibro (Wireless broadband), Wimax (World Interoperability for Microwave Access), HSDPA (High Speed Downlink Packet Access), and so on.

The short range communication module 517 refers to a module for short range communication. Technologies for short range communication include Bluetooth, RFID (Radio Frequency Identification), IrDA (Infrared Data Association), UWB (Ultra Wideband), ZigBee, and the like.

The GPS (Global Positioning System) module 519 receives location information from a plurality of GPS satellites.

The A/V (Audio/Video) input unit 520 is intended for receiving an audio signal or video signal, which includes a camera 521, microphone 523, and so on. The camera 521 processes image frames such as still images or moving images obtained from an image sensor in a video communication mode or a capture mode. The processed image frames can be displayed on a second display unit 551.

The image frames processed by the camera 521 can be stored in the memory 560 or transmitted to the outside through the wireless communication unit 510. The camera 521 can be equipped with two or more camera depending on configuration type of the terminal.

The microphone 523 receives an external sound signal from a microphone and converts the input signal into electrical voice data in a communication mode, recording mode, or voice recognition mode. In the case of communication mode, the processed voice data can be output in a form transmittable to a mobile communication base station through the mobile communication module 513. The microphone 523 may utilize various noise-cancelling algorithms to remove noise generated while receiving external sound signals.

The user input unit 530 generates a key input data received from the user for controlling the operation of a terminal. The user input unit 530 may comprise a keypad, dome switch, touchpad (static pressure/electrostatic), and so on, with which a command or information due to the user's push or touch operation can be received. Also, the user input unit 530 may be implemented by a jog wheel or jog mechanism based on rotation of keys, an operating type such as a joystick, finger mouse, and so on. In particular, if a touchpad constitutes a bilateral layer structure together with a second display unit 551 to be described later, the resulting assembly is called a touchscreen.

The sensing unit 540 generates a sensing signal for detecting current states of the mobile terminal 500 such as opening or closing of the mobile terminal 500, location of the mobile terminal 500, user's touch state, and so on; and controlling the operation of the mobile terminal 500. For example, in case the mobile terminal 500 is slide phone type, the sensing unit 540 can detect whether the slide phone is opened or closed. Also, a sensing function related to whether the power supply 590 is providing power, whether the interface unit 570 is connected to an external device, and so on can be carried out.

The sensing unit 540 may include a proximity sensor 541, a pressure sensor 543, and a motion sensor 545. The proximity sensor 541 allows detection of an object approaching the mobile terminal 500 or existence of an object in the vicinity of the mobile terminal 500, and so on without mechanical contact. The proximity sensor 541 can detect an object in the vicinity by using variation of alternating or static magnetic flux or variation of electrostatic capacity. Two or more proximity sensors 541 can be installed depending on the configuration type.

The pressure sensor 543 detects existence of pressure applied to the mobile terminal 500 and magnitude of the pressure. Depending on the working environment, the pressure sensor 543 can be installed in the area of the mobile terminal 500, where detection of pressure is required. If the pressure sensor 543 is installed in the second display unit 551, a touch input through the second display unit 551 and a pressure-touch input where pressure larger than that of a touch input is applied can be distinguished according to a signal output from the pressure sensor 543. Also, according to a signal output from the pressure sensor 543, magnitude of pressure applied to the second display unit 551 at the time of pressure-touch input can be known.

The motion sensor 545 detects position or motion of the mobile terminal 500 by using an accelerometer, gyro sensor, and so on. The accelerometer used for the motion sensor 545 refers to a device capable of converting a change in acceleration along a particular axis into an electrical signal, now being widely used in accordance with the advancement of MEMS (Micro-Electromechanical System) technology. Various types of accelerometer are used today, ranging from an accelerometer measuring a large acceleration value, being embedded in an airbag system of an automotive and used for measuring collision to an accelerometer measuring a minute value of acceleration observed from a detailed motion of the human hand and used for an input means for games. An accelerometer is usually constructed by assembling two or three axis measurement modules into a single package; in some case, only single axis (for example, Z-axis) measurement is implemented. Therefore, in case an accelerometer measuring acceleration along X- or Y-axis instead of Z-axis has to be employed due to some other reasons, a separate board module may be needed to install the accelerometer standing against a main board.

In addition, a gyro sensor measures an angular velocity and can detect a direction rotated with respect to a reference direction.

The output unit 550 is intended for output of audio signal, video signal, or alarm signal. The output unit 550 comprises a second display unit 551, sound output module 553, alarm unit 555, and haptic module 557.

The second display unit 551 displays information processing in the mobile terminal 500. For example, in case the mobile terminal 500 is in a communication mode, the second display unit 551 displays a UI (User Interface) or GUI (Graphic User Interface) related to communication. In case the mobile terminal 500 is in a video communication mode or capture mode, the second display unit 551 displays captured or received images separately or simultaneously along with displaying UI or GUI.

Meanwhile, as described above, in case the second display unit 551 and the touchpad construct a bilateral layer structure and thus form a touchscreen, the second display unit 551 may be utilized as an input device capable of receiving information from a touch input by the user in addition to output devices.

If the second display unit 551 is used for a touchscreen, the second display unit 551 may include a touchscreen panel, touch screen panel controller, and so on. In this case, the touchscreen panel, which is implemented by a transparent panel attached to the outside, can be connected to the internal bus of the mobile terminal 500. The touchscreen panel monitors a touch result; in case of a touch input, the touchscreen panel sends signals corresponding to the touch input to the touchscreen panel controller. The touchscreen panel controller processes the signals and transmits the corresponding data to the second controller 580, informing the second controller 580 about the occurrence of a touch input and which area has been touched.

The second display unit 551 can be implemented by e-paper. E-paper is a kind of reflective display, providing excellent visual characteristics such as high resolution, large field of view, and bright white background possessed by the conventional paper and ink. The e-paper can be implemented in any types of substrates including plastic, metal, and paper; the e-paper preserves an image after power is turned off and does not require a backlight power supply, thereby supporting a longer battery life. For the e-paper, semi-spherical twist balls charged with static charges, electrophoresis, and micro-capsules can be used.

In addition to the above, the second display unit 551 can comprise at least one of a liquid crystal display, thin film transistor-liquid crystal display, organic light-emitting diode, flexible display, and 3D display. Two or more second display units 551 can be employed depending on the implementation type of the mobile terminal 500. For example, the mobile terminal 500 can be equipped with an external second display unit (not shown) and an internal second display unit (not shown) at the same time.

The sound output module 553 outputs audio data received from the wireless communication unit 510 or audio data stored in the memory 560 at the time of receiving a call signal, in a communication or recording mode, in a voice recognition mode, or a broadcasting receiving mode. Also, the sound output module 553 outputs a sound signal related to functions carried out in the mobile terminal 500, for example, a call signal receiving sound, a message receiving sound, and so on. Such a sound output module 553 may include a speaker, buzzer, and the like.

The alarm unit 555 outputs a signal for informing of the occurrence of an event in the mobile terminal 500. Examples of an event occurring in the mobile terminal 500 include a call signal reception, message reception, key signal reception, and the like. The alarm unit 555 outputs a signal for informing of the occurrence of an event other than audio or video signal. For example, the alarm unit 555 can output a signal in the form of vibration. In case a call signal or a message is received, the alarm unit 555 can output a signal to inform the event. Also, in case a key signal is received, the alarm unit 555 can output a signal as feedback for the key signal input. Through the signal produced by the alarm unit 555, the use can perceive the occurrence of the corresponding event. A signal for informing of the occurrence of an event in the mobile terminal 500 can be produced through the second display unit 551 or the sound output module 553.

The haptic module 557 generates various types of tactile sensation that the user can feel. A typical example of tactile sensation generated by the haptic module 557 is a vibration effect. In case the haptic module 557 generates vibration as tactile sensation, the intensity and pattern of the vibration generated by the haptic module 557 can be changed and different vibrations can be synthesized to be output as a single vibration or output individually one by one.

The haptic module 557, in addition to vibration, can generate various tactile sensations such as the effect due to stimuli of a pin array performing a vertical movement against a contact surface of skin, effect due to stimuli generated by a spraying force or suction force of the air through the spraying or suction opening, effect due to stimuli touching the skin surface, effect due to stimuli through contact of electrodes, effect of stimuli through electrostatic force, effect due to stimuli generated by realizing a feeling of warmth or cold by using a device capable of absorbing or generating heat, and so on. The haptic module 557 can be implemented in such a way that tactile sensations can be delivered through direct contact or tactile sensations can be felt through muscular sensations of the user's finger or arm. Two or more haptic modules 557 can be installed depending on the configuration type of the mobile terminal 500.

The memory 560 can store programs for processing and controlling the second controller 580 and carry out a function for temporarily storing input and output data (for example, phonebook, messages, still images, moving images, and so on).

The memory 560 includes at least one type of storage media among flash memory type, hard disk type, multimedia card micro type, card type memory (for example, SD or XD memory), RAM, and ROM. Also, the mobile terminal 500 can run a web storage carrying out a storage function of the memory 550 in the Internet.

The interface unit 570 provides a function of interfacing all of the external devices connected to the mobile terminal 500. Examples of external devices connected to the mobile terminal 500 include a card socket pairing with a wired/wireless headset, external charger, wired/wireless data port, memory card, SIM (Subscriber Identification Module) card, UIM (User Identity Module) card and so on; audio I/O (Input/Output) port; video I/O port; earphone; and so on. The interfacing unit 570 receiving data or power from such an external device delivers the data or power to each constituent component inside the mobile terminal 500 or makes the data inside the mobile terminal 500 transmitted to the external device.

When the mobile terminal 500 is connected to an external cradle, the interface unit 570 acts as a path through which power from the connected cradle is supplied to the mobile terminal 500 or a path through which various command signals input to the cradle by the user are delivered to the mobile terminal 500.

In general, the second controller 580 controls the operation of the individual units, thereby controlling the overall operation of the mobile terminal 500. For example, the second controller 580 carries out control and processing related to voice, data, and video communication. Also, the second controller 580 can be equipped with a multimedia play module 181 for playing multimedia contents. The multimedia play module 181 can be implemented in the form of hardware within the second controller 580 or in the form of software separate from the second controller 580.

The power supply 590 receives external and internal power being controlled by the second controller 590 and provides power required for the operation of the individual components.

As described above, the mobile terminal 500 can be configured to operate in a communication system capable of transmitting data in units of frames or packets, including a wired or wireless communication system and a satellite-based communication system.

Figure 6:
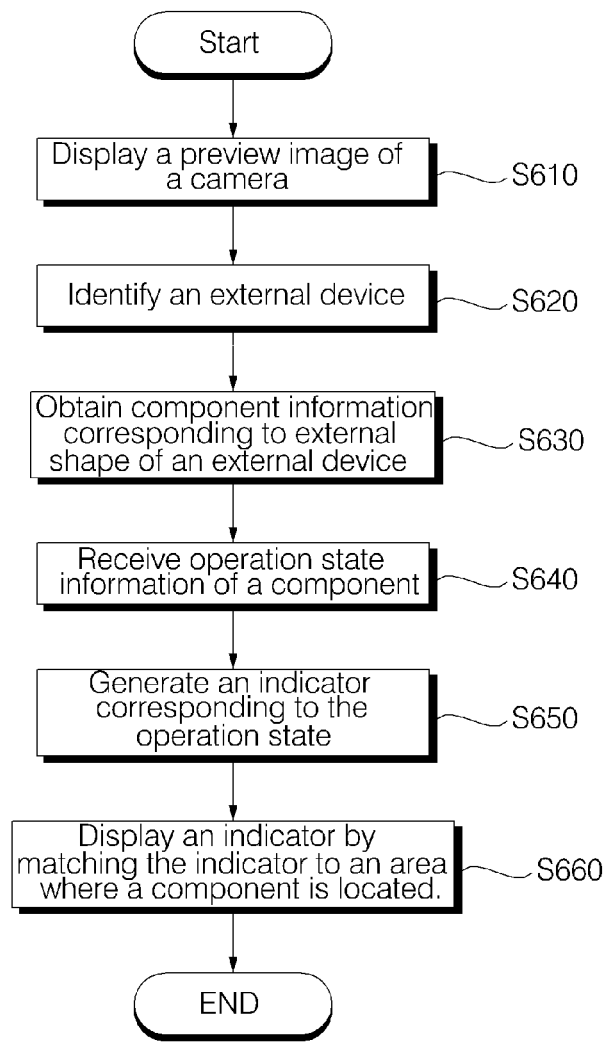
FIG. 6 illustrates a method for providing an indicator corresponding to the operation state of an external device according to one embodiment of the present invention.

FIG. 6 illustrates a method for providing an indicator corresponding to the operation state of an external device according to one embodiment of the present invention.

With reference to FIG. 6, first of all, if the user configures the mode of the mobile terminal as augmented reality mode, the second display unit of the mobile terminal displays a preview image of the camera S610. More specifically, if the user selects the operation mode as augmented reality mode through a manual of the mobile terminal, the second display unit displays a preview image which displays an image to be captured through the camera beforehand (in what follows, it is called a 'preview image of a camera' or 'preview image'). The augmented reality mode of the present embodiment refers to a mode of the mobile terminal where a real-world image is provided in conjunction with information related to the real-world image.

The second controller 580 identifies an external device included in a preview image of the camera, particularly the product name and external view of the external device S620. To identify an external device, the second controller 580 can utilize at least one of shape recognition, location information of the mobile terminal, location information of the external device, and viewing direction information of the camera.

In the following, a method for identifying an external device is described in more detail. The second controller 580 carries out shape recognition for an object displayed in a preview image and compares the shape recognition result with external shape information of electronic devices recorded in an electronic device database of the memory. In case the electronic device database is not stored in the memory, the second controller 580 attempts to connect to an external server equipped with an electronic device database through a wireless communication unit and makes use of the electronic device database of the external server. From the comparison result, the second controller 580 identifies the external device displayed in the preview image.

The electronic database stores for each electronic device the product name, external shape information of an electronic device, information of components used inside the electronic device, position information of components, image information of the components. It is preferable to use virtual image information for the image information of the components. And it is preferable to confine the component information stored in the electronic device database to the component information indicating the operation states of the components used in the air conditioner.

Meanwhile, to facilitate recognition of external devices, an identifier such as barcode can be attached to external devices. Therefore, the second controller 580 may be able to identify an external device by recognizing the shape of an identifier attached to the external device displayed in a preview image of the camera.

Similarly, the second controller 580 can identify an external device displayed in a preview image of the camera by comparing information of position and orientation of the mobile terminal (in what follows, it is called 'position information of the mobile terminal') with the position information of external devices.

It is preferable to use GPS information as the position information; however, since GPS information is not readily available for indoor environments, the second controller 580 may utilize a WPS (WiFi Position Service) method employing wireless Internet, a method based on Bluetooth, and a method based on RFID, and so on.

As described above, the second controller 580 can not only identify the product name of an external device displayed in a preview image by using at least one of the position information of the mobile terminal, position information of the external device, orientation information of the camera, and shape recognition but also identify the external shape of the external device displayed on the preview image.

Then the second controller 580 obtains component information corresponding to the external shape of an external device displayed in a preview image S630. Since the electronic device database stores external shape information of an external device and information of components used inside the device by pairing them with each other, the second controller 580 can obtain component information from the external shape information of the external device by using the electronic device database.

Meanwhile, according to the functions performed, components of an external device can be divided into supporting components which form the external shape of the external device or support other components and functional components carrying out particular functions at the time of operation of the external device. The functional components can be further divided into control components controlling the operation of other components, operation components carrying out particular operations according to the control of the control components and generating information about inherent operation states and sensing components detecting information about the operation states of the operation components.

Since the present embodiment provides an indicator about the operation state, the electronic device database contains external shape information and information about the operation components, being matched with each other and the second controller 580 can obtain information about the operation components corresponding to the external shape.

To obtain information about the operation states of identified components, the second controller 580 requests and receives information about the operation states of the components from the external device S640. The external device collects and keeps information about the operation states of individual components and if the mobile terminal requests the information, the external device provides the requested information about the operation states of operation components. Similarly, in case of request for information about the operation states, the first controller makes the information about the operation state detected by the corresponding sensing unit transmitted to the mobile terminal through the first communication unit 171. The information about the operation state may correspond to a particular value represented by a text.

Now the second controller 580 generates an indicator corresponding to the operation state of the component in question based on the information about the operation state and the image information of the identified component S650. The indicator corresponding to the operation state can be generated by combining the component image and the operation state of the component with an image or text. Also, an image or text indicating whether the operation state gets out of a predetermined reference range can be included. Moreover, in case the operation state departs the reference range, either image or text illustrating a method for handling the component can be included so that the corresponding operation state is made to belong to the reference range. Here, the reference range denotes a suitable state for a component to operate while being out of the reference range indicates abnormality of the component or a state which requires a predetermined treatment for the component even if the component is in a normal state.

Next the second controller 580 displays an indicator by matching the indicator with an area where the corresponding component is located in a preview image S660. More specifically, it is preferable that the second controller 580 displays the image of an indicator in the area where a component is located in a preview image while an image or text is displayed in the area where the component is located or in the area adjacent to the component.

FIGS. 7 to 10 illustrate an indicator corresponding to the operation state of an external device according to a first embodiment of the present invention.

Figure 7:
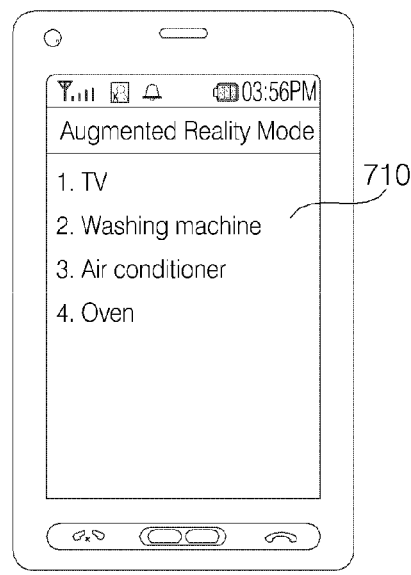
FIGS. 7 to 10 illustrate an indicator corresponding to the operation state of an external device according to a first embodiment of the present invention.

If augmented reality mode is selected, as shown in FIG. 7, the second controller 580 displays on the second display unit 551 a list 710 of external devices capable of providing information about the operation states. The user selects an external device of which the user wants to check the operation state. In the example of FIG. 7, the user selects an air conditioner as an external device.

Figure 8:
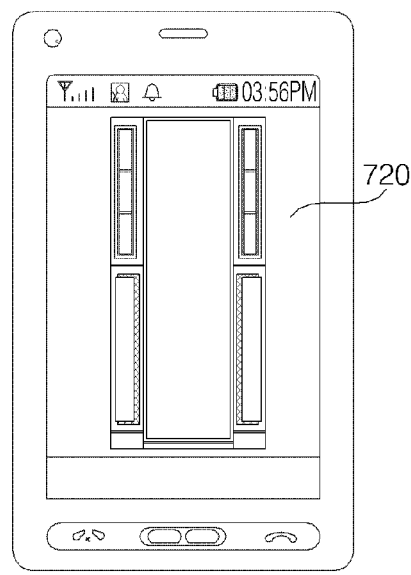

Then the second controller 580 turns on the camera and as shown in FIG. 8, displays a preview image 720 of the camera on the second display unit. Then it is determined whether the selected external device is included in the preview image 720 of the camera. In other words, the second controller 580 determines whether the preview image 720 contains an air conditioner. More specifically, the second controller 580 compares external shape information of an air conditioner stored in the electronic device database with the shape of an object included in the preview image and determines whether the preview image 720 contains the air conditioner.

Figure 9:
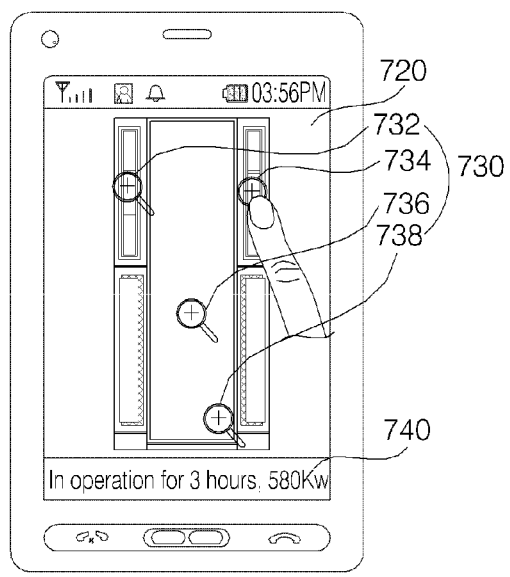

If an air conditioner is included in the preview image 720 of the camera, the second controller 580 determines whether the external shape of the air conditioner included in the preview image 720 and the corresponding component information are pre-stored in the electronic device database. In other words, the second controller 580 determines whether the external shape of the air conditioner included in the preview image 720 corresponds to the front panel, side panel, or rear panel of the air conditioner and which part of the panel the external shape corresponds to. Then it is determined whether component information corresponding to the external shape of the air conditioner is pre-stored in the electronic device database. If the component information is stored in the electronic device database, the corresponding component can be regarded as a component capable of providing information about the operation state; therefore, as shown in FIG. 9, the second controller 580 displays an icon 730 indicating the existence of a component capable of providing information about the operation state in an area of the preview image 720 where the component is located. In the example of FIG. 9, a plurality of icons 730 are displayed and the user touches the area where a first icon 732 among the plurality of icons 730 is displayed.

The user can input a command for displaying the operation state by using a method of touching the area where the first icon 732 is displayed. Then the second controller 580 requests information about the operation state of the corresponding component from the first icon 732. And the second controller 580 receives information about the operation state of the component from the air conditioner.

Figure 10:
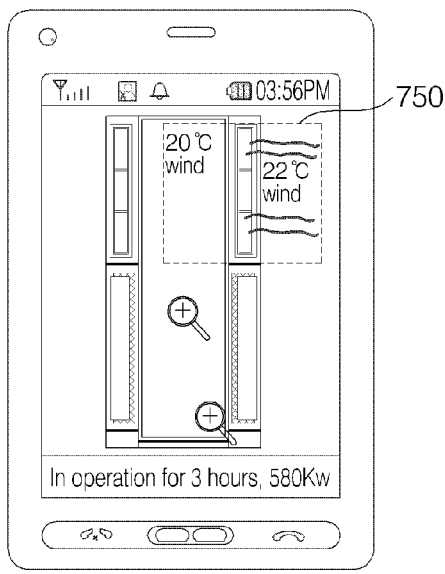

The second controller 580 generates an indicator 750 corresponding to the received operation state to allow the user to easily recognize the information about the operation state received from the air conditioner and displays the indicator as shown in FIG. 10. In the example of FIG. 10, the user touches the area where a component adjusting the direction of air flow is located; therefore, the second controller 580 requests information about the operation state of an air exhaust opening vane, which is a component for adjusting the direction of air flow, from the air conditioner and receives the information. Then, the second controller 580 obtains the image of the air exhaust opening vane from the electronic device database and generates an indicator 750 corresponding to the operation state of the air exhaust opening vane based on the information about the operation state and the image of the air exhaust opening vane and displays the indicator in the area where the air exhaust opening vane is located. In the example of FIG. 10, the indicator 750 displays as the operation state of the air exhaust opening vane an image representing direction of air flow generated, speed of the air flow, indoor and outdoor temperature of the air conditioner.

FIGS. 11 to 14 illustrate an indicator corresponding to the operation state of an air conditioner according to a second embodiment of the present invention.

Figure 11:
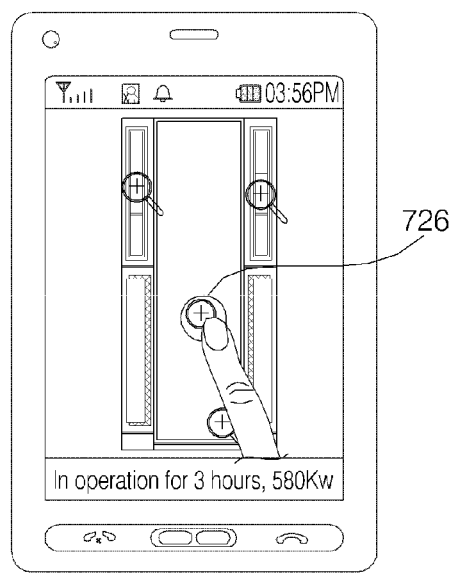
FIGS. 11 to 14 illustrate an indicator corresponding to the operation state of an air conditioner according to a second embodiment of the present invention.
Figure 12:
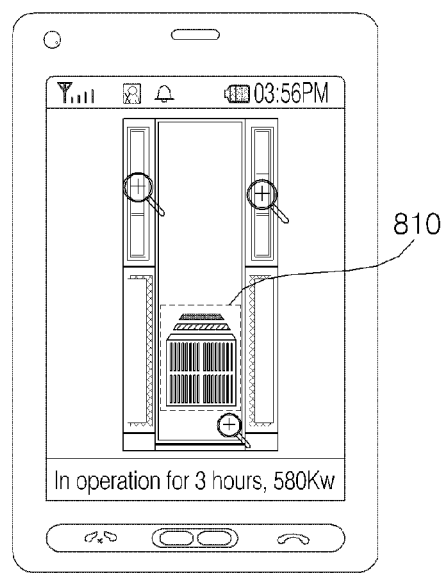

As shown in FIG. 11, the user touches an area of a preview image, where the second icon 726 is displayed. Then the second controller 580 requests information about the operation state of a filter located in the area where the second icon 726 is displayed (for example, pollution level of the filter) from the air conditioner and receives the information. Then the second controller 580 generates an indicator 810 corresponding to the received operation state and displays the indicator as shown in FIG. 12. The indicator 810 of the operation state of the filter in this case employs an image of a filter with a color identified according to the operation state of the filter. In other words, pollution level of the filter can be represented by a color.

Figure 13:
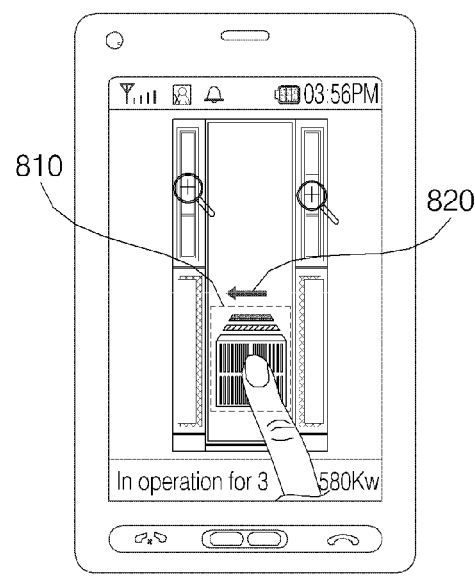
Figure 14:
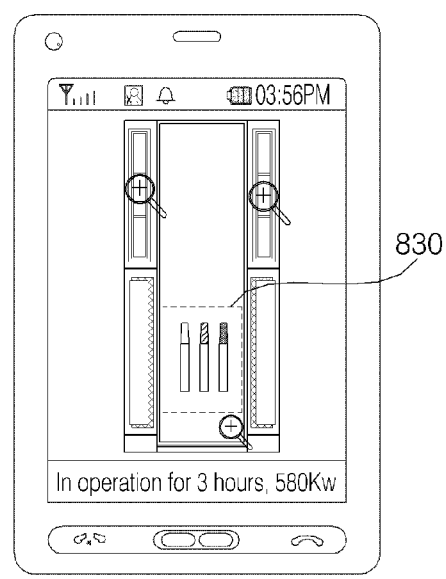

Meanwhile, since a plurality of filters is used for air cleaning, a corresponding number of filter images have to be introduced for indicators 810. Suppose the user tries to check in more detail the information about the operation states of filters overlapping and thus not displayed. Then, as shown in FIG. 13, the user inputs a command 820 by touching the area where the indicator is displayed and dragging the touch in a left direction. Then, as shown in FIG. 14, the second controller 580 displays the indicator 830 corresponding to the state information of a right side surface of the filter. If the user further wants to check the information about the operation state of the rear surface among the filters, the user can input a command by touching the screen and dragging the touch in a left direction. In this way, the user can check the information about the operation state of the filter from various view angles.

Figure 15:
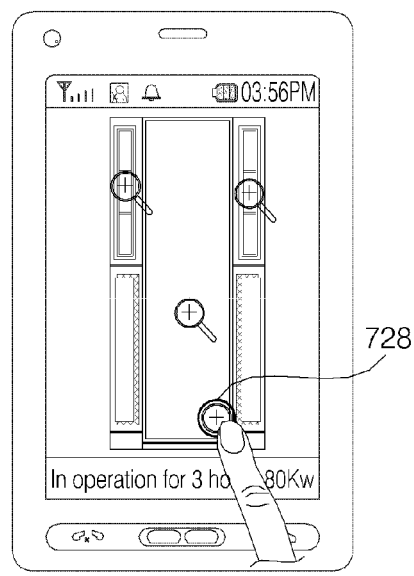
FIGS. 15 and 16 illustrate an indicator corresponding to the operation state of an air conditioner according to a third embodiment of the present invention.
Figure 16:
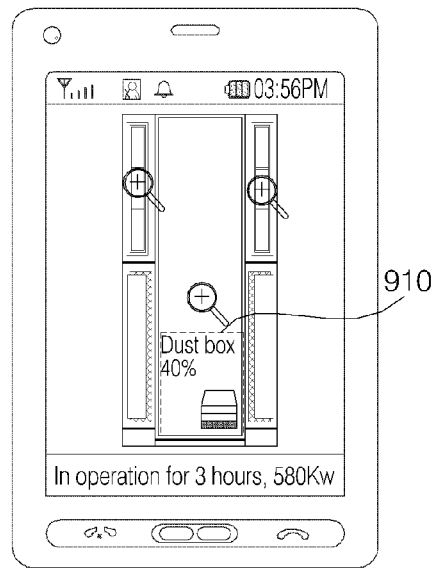

FIGS. 15 and 16 illustrate an indicator corresponding to the operation state of an air conditioner according to a third embodiment of the present invention.

As shown in FIG. 15, the user can touch the area of the preview image, where a third icon 728 is displayed. Then the second controller 580 requests information about the operation state of a dust box located in the area where the third icon 728 is displayed (for example, storage rate of the dust box) from the air conditioner and received the information. The second controller 580 generates an indicator 910 corresponding to the received operation state and displays the indicator as shown in FIG. 16. The indicator 910 corresponding to the operation state of the dust box is represented by an image denoting the dust box and a combination of a distinctive image and text for the information about the operation state of the dust box.

Figure 17:
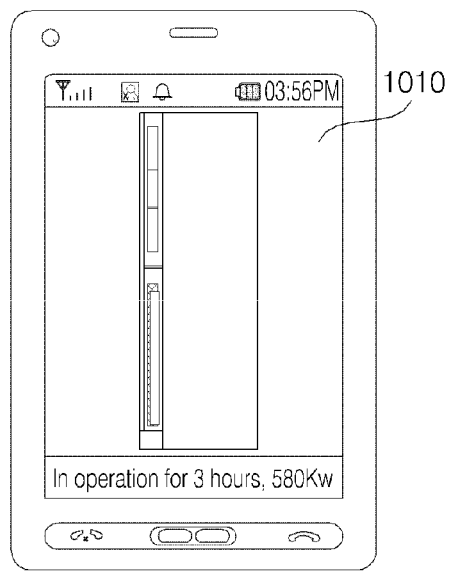
FIGS. 17 to 19 illustrate an indicator corresponding to the operation state of an air conditioner according to a fourth embodiment of the present invention.
Figure 18:
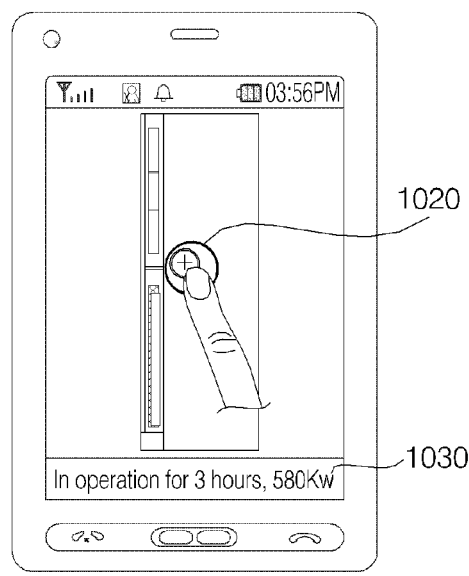
Figure 19:
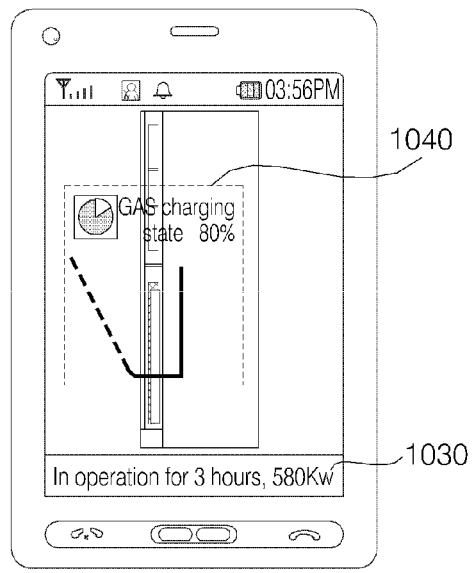

FIGS. 17 to 19 illustrate an indicator corresponding to the operation state of an air conditioner according to a fourth embodiment of the present invention.

The user makes the camera lens to look at the side surface of the air conditioner. Then, as shown in FIG. 17, the second display 551 displays a preview image 1010 containing a side surface panel of the air conditioner. Then the second controller 580 determines whether there exists information of components corresponding to the side surface panel. In case component information corresponding to the side surface panel is contained in the electronic device database, as shown in FIG. 18, the second controller 580 displays a fourth icon 1020 informing of existence of components capable of providing the operation state. If the user touches an area where the fourth icon 1020 is displayed, the second controller 580 requests information about the operation state of a component (for example, a gas pipe) corresponding to the fourth icon 1020 from the air conditioner and receives the information.

Next, the second controller 580 generates an indicator 1040 corresponding to the operation state by using the information about the operation state and image information of the component and as shown in FIG. 19, displays the indicator in the area where the component is located and an area adjacent thereto. The indicator 1040 of FIG. 19 uses an image representing a gas pipe and gas charging state of the gas pipe is represented by a color applied to the gas pipe image, where text is introduced additionally.

In case information about the operation state departs the reference range, the indicator corresponding to the operation state can include an image or text informing of being out of the reference range; and an image or text illustrating a method for handling the component so that the corresponding operation state is made to belong to the reference range.

Figure 20:
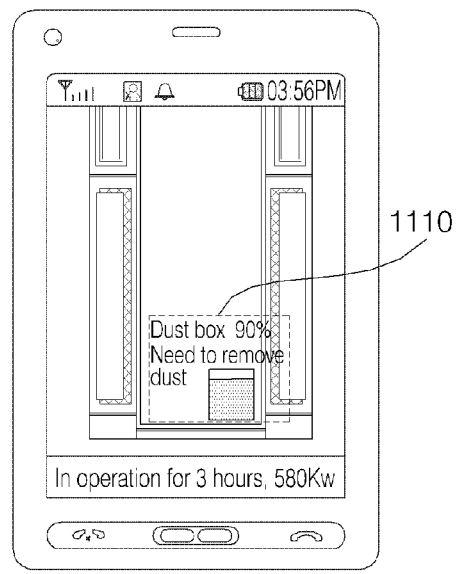
FIGS. 20 to 22 illustrate an indicator corresponding to the operation state of an air conditioner according to a fifth embodiment of the present invention.
Figure 21:
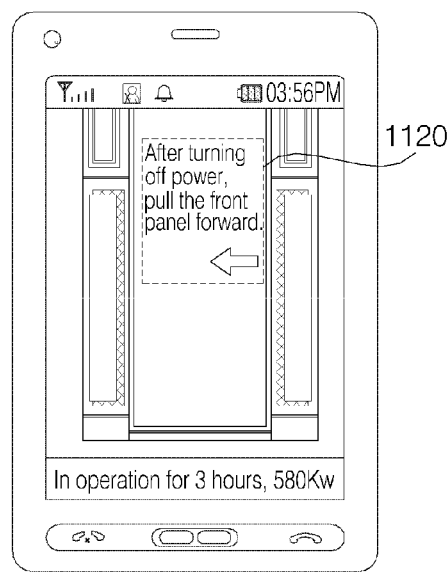
Figure 22:
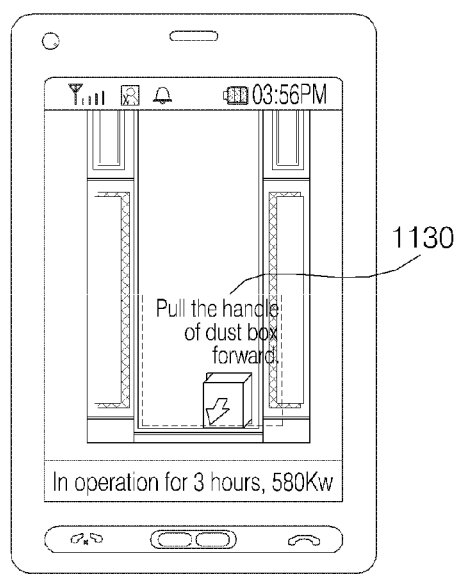

FIGS. 20 to 22 illustrate an indicator corresponding to the operation state of an air conditioner according to a fifth embodiment of the present invention.

As shown in FIG. 20, the indicator 1110 of a dust box includes a text informing of being out of a reference range. If a user command of touching an area which displays the indicator 1110 is received, an indicator informing of a method for handling a component can be displayed to make the operation state of the component belong to the reference range. More specifically, as shown in FIG. 21, a first guiding indicator 1120 opening the front panel of the air conditioner is displayed. If the user touches an area containing the first guiding indicator 1120, as shown in FIG. 22, a second guiding indicator 1130 informing of a method for separating the dust box from the main body. As described above, in case the method for processing components comprises a plurality of guiding indicators, the second controller 580, if an area containing a guiding indicator is touched, displays the next guiding indicator, thereby providing the user with detailed description about a method for processing components.

If a preview image of the camera as well as the method of touching an area displaying a guiding indicator changes as the user operates according to the guiding indicator, the second controller 580 can display the next guiding indicator based on a preview image of the camera.

Also, in case the information about the operation state goes out of a reference range, the controller obtains contact information of other external devices (for example, a telephone prepared at a service center providing services for external devices, mobile terminal, and so on) from the electronic device database; generates a communication event; and transmits the event to the external device identified by the contact information. Here, a communication event refers to a call signal for establishing a communication link with an external device identified by the contact information or a message describing that the information about the operation state goes out of the reference range. Also, transmission of the communication event can be carried out by the user command or automatically.

Figure 23:
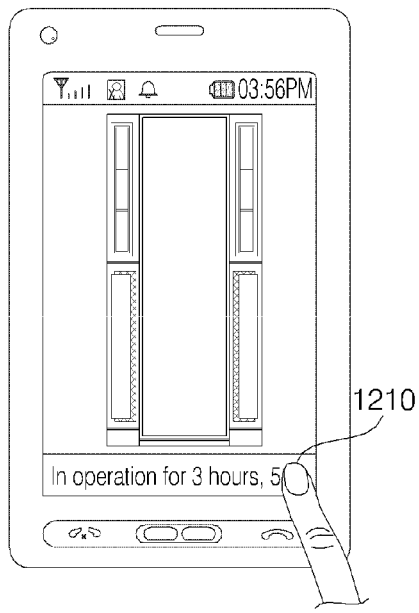
FIGS. 23 and 24 illustrate a method for displaying a use history of an air conditioner according to one embodiment of the present invention.
Figure 24:
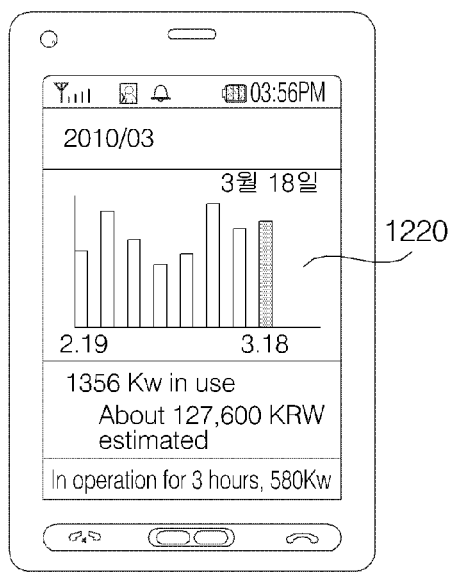

FIGS. 23 and 24 illustrate a method for displaying a use history of an air conditioner according to one embodiment of the present invention.

As shown in FIG. 23, the user touches an area displaying use history information 1210 of the air conditioner. Then the second controller 580 displays the use history information 1220 during a predetermined period as shown in FIG. 24. If a user command of touching the area displaying the use history information and dragging the touch is received, the second controller 580 adjusts a predetermined period in response to the dragging direction and displays the use history information during the adjusted predetermined period. For example, if a user command of dragging a touch to make multi-touch points separated farther apart from each other, the second controller 580 displays the use history information by reducing the range of the predetermined period. On the other hand, if a user command of dragging a touch to make multi-touch points come close to each other, the second controller 580 displays the user history information by enlarging the predetermined range.

Meanwhile, the present invention can be implemented as program codes readable by a processor in a recording medium readable by a processor installed in a mobile terminal. Recording media readable by a processor includes all kinds of recording devices in which processor-readable data are stored. Examples of processor-readable recording media include ROM, RAM, CD-ROM, magnetic tape, floppy disk, optical data storage device, and so on, further including the one implemented in the form of carrier waves such as transmission through the Internet. Also, processor-readable recording media can be distributed across computer systems connected through a network and processor-readable codes can be stored and carried out in a distributed manner.

Preferred embodiments of the present invention have been described in detail so far; however, the present invention is not limited to the embodiments of this document and it should be understood by those skilled in the art that various modifications and changes of the present invention are possible without departing from the technical scope of the present invention defined by the appended claims. The modifications should not be understood separately from the technical principles or perspectives of the present invention.

The invention claimed is:

1. A method for providing operation state of an external device, comprising:
   displaying a preview image of a camera;
   identifying an external device displayed on the preview image;
   generating an indicator corresponding to the operation state of the external device; and displaying the indicator by matching the indicator to an area in the preview image to which a component related to the operation state belongs, wherein identification of the external device consists of identifying a product name of the external device and identifying the component prepared inside the external device, wherein the indicator includes an image corresponding to the component, wherein the image corresponding to the component is displayed in an area of the preview image, where the component is located, wherein the indicator includes a plurality of the component images, which are overlapped and thus not displayed, and wherein, when the indicator is touched and dragged in some direction, the component images are displayed in various view angles with the operation state of the component.

2. The method of claim 1, wherein the indicator is not displayed on an external shape of the external device beforehand.

3. The method of claim 1, wherein the component is prepared inside the external device and thus is not displayed in the preview image.

4. The method of claim 1, further comprising:
receiving information about the operation state from the external device; and
generating the indicator by combining the information about the operation state and the image corresponding to the component.

5. The method of claim 1, wherein the indicator includes at least one of image and text describing the operation state.

6. The method of claim 5, wherein at least one of the image and text is displayed in an area of the preview image where the component is located or in an area adjacent to the area where the component is located.

7. The method of claim 1, wherein, if the operation state is determined to be out of a reference range, the indicator includes an image or text informing that the operation state is out of the reference range.

8. The method of claim 1, further comprising transmitting a communication event to other external devices related to the external device if the operation state is determined to be out of a reference range.

9. The method of claim 1, wherein, if the operation state is determined to be out of a reference range, a telephone number or text related to the external device is included in the indicator.

10. The method of claim 1, wherein the external device is an air conditioner and the operation state is at least one of direction of air flow output at the time of operation of the air conditioner, pollution level of a filter, and a dust storage rate of a dust box.

11. The method of claim 1, further comprising, if the operation state is determined to be out of a reference range, displaying a guiding indicator for informing of a method for handling a component to make the operation state of the component belong to the reference range, when the indicator is touched.

12. A mobile terminal, comprising:
a camera;
a display unit displaying a preview image of the camera; and
a controller identifying an external device displayed on the preview image, generating an indicator corresponding to the operation state of the external device, and displaying the indicator by matching the indicator to an area in the preview image to which a component related to the operation state belongs,
wherein the indicator includes the image corresponding to the component,
wherein identification of the external device consists of identifying a product name of the external device and identifying the component prepared inside the external device,
wherein the controller combines the information about the operation state and an image corresponding to the component, and generates the indicator,
wherein the image corresponding to the component is displayed in an area of the preview image where the component is located,
wherein the indicator includes a plurality of the component images, which are overlapped and thus not displayed, and
wherein, when the indicator is touched and dragged in some direction, the component images are displayed in various view angles with the operation state of the component.

* * * * *